June 9, 1959  J. Z. DE LOREAN  2,889,715
AUTOMATIC TRANSMISSION WITH SPLIT DRIVE IN HIGH RANGE
Filed Jan. 19, 1956

INVENTOR.
John Z. De Lorean
BY
Wilson Kedrow & Sadler
ATTORNEYS

United States Patent Office 2,889,715
Patented June 9, 1959

2,889,715
AUTOMATIC TRANSMISSION WITH SPLIT DRIVE IN HIGH RANGE

John Z. De Lorean, Grosse Pointe Woods, Mich., assignor to Studebaker-Packard Corporation, Detroit, Mich., a corporation of Michigan Application January 19, 1956, Serial No. 560,200

18 Claims. (Cl. 74—688)

This invention relates to a variable speed automatic transmission including a torque converter in combination with a gear reduction system, which is adapted to provide a split drive through the converter when the transmission is conditioned to operate in high range drive.

Various transmissions have been developed utilizing a converter in combination with a gear reduction system. Generally, such systems are provided with a converter lock-up clutch in order to obtain a direct drive through the transmission when the gear set is locked. As a result, the prior arrangements generally required a hydraulic motor, or the like to operate the lock-up clutch, and in addition a complicated control system is required to control the operation of the motor as well as to condition the transmission brakes and clutches to lock the gear set. Such arrangements are not only complicated and difficult to maintain in proper working order, but add greatly to the overall cost of the transmission.

In order to simplify the construction of such transmissions, as well as to reduce their cost, the applicant has developed an automatic multi-speed transmission which does not require a lock-up clutch for the converter, and therefore does not require complicated controls for operating the same. This objective is accomplished by inserting an annular, impeller driven element between the turbine and reactor members of the converter. The annular element in turn is drivingly connected to a reaction sun gear of a planetary gear system through a selectively operable clutch. When the clutch is operated, the sun gear is driven at a 1:1 ratio with respect to the engine, and as a result, the planetary gears are locked, and the transmission output shaft is driven in direct drive.

Figure 1:
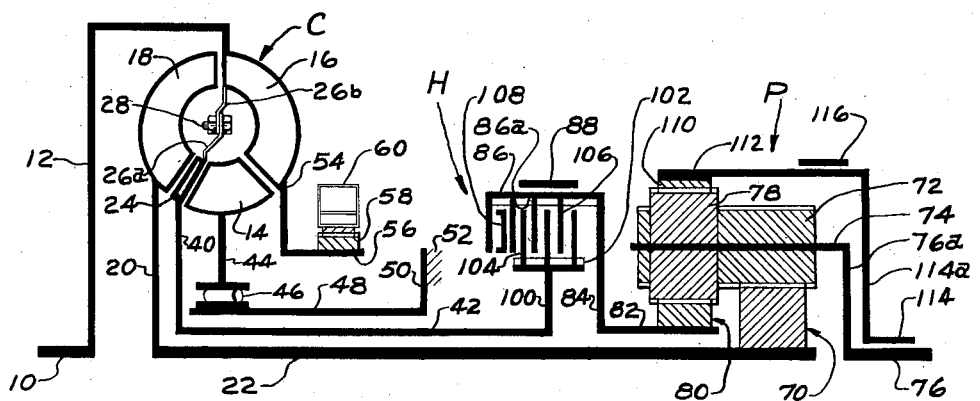

For a better understanding of the present invention, reference may be had to the accompanying drawings, in which:

Figure 1 is a schematic side elevation of the transmission; and

Figure 2:
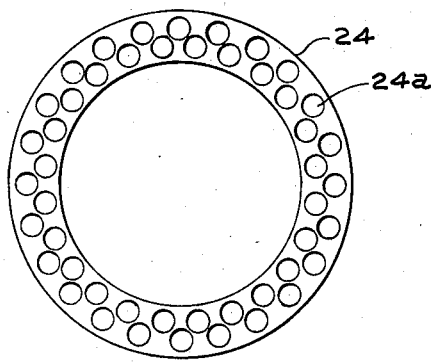

Figure 2 discloses an annular perforated element utilized in conjunction with the transmission converter.

As will be seen in Figure 1 input shaft 10 is connected to a fly wheel 12, which in turn is fixedly connected to an impeller member 16 of a fluid torque converter C. The converter C includes a reactor member 14 and a turbine member 18; the latter being connected by a radial element 20 to an intermediate shaft 22 disposed in substantially axial alignment with imput shaft 10. An annular element 24 having a plurality of openings 24a therein, as shown in Figure 2, is interposed between the turbine and reactor members. The inner periphery of annular element 24 has a bracket 26a formed integral therewith, which is connected by bolt 28 to bracket 26b connecting with the impeller member 16. The outer periphery of the annular element 24 is connected by a radially extending element 40 to the forward end of a sleeve 42 which is rotatably supported about the forward end of intermediate shaft 22. Thus, it will be seen that as input shaft 10 drives the impeller 16, the annular element 24 and the inner sleeve 42 are driven therewith, at a 1:1 ratio.

The reactor member 14 is connected by a radial element 44 to a one-way brake mechanism 46 carried by an outer sleeve 48, which is supported about the inner sleeve 42. The rearward end of the sleeve 48 has a flanged portion 50, which is grounded to the transmission casing, as indicated at 52. The one-way brake mechanism may be of various forms apparent to those skilled in the art, and serves to prevent the reactor from being rotated in a reverse direction in respect to the normal direction of rotation of impeller 16.

The impeller 16 is also connected by radial element 54 to a collar 56 which is rotatably supported about the outer sleeve 48. The collar in turn carries an externally toothed ring gear 58 which drives hydraulic fluid pump indicated at 60, which may be utilized for supplying fluid pressure to the transmission.

A driving sun gear 70 of the planetary gear system P is fixedly supported on the rearward end of the intermediate shaft 22 and is adapted to mesh with a long pinion gear 72 rotatably supported by a planet carrier 74. The carrier in turn is connected to a flanged portion 76a of the transmission output shaft 76, disposed substantially in axial alignment with the input and intermediate shafts, 10 and 22, respectively. The carrier 74 also rotatably supports a short pinion gear 78 which meshes with the long pinion gear 72, and a reaction sun gear 80, carried by a collar 82, rotatably supported about the end of the intermediate shaft 22. Collar 82 is connected by radial element 84 with an annular brake drum 86, which is concentrically disposed about the intermediate shaft 22. A low range brake band 88, as will appear more fully below, is adapted to be selectively engaged with drum 86 to hold the reaction sun gear 80 in a fixed position with respect to the intermediate shaft.

The rearward end of the inner sleeve 42 is connected by radial element 100 to an inner drum 102 which is concentrically disposed in a spaced apart relationship within the outer drum 86, forming therebetween the housing for the high range clutch H. Clutch discs 104, carried by inner drum 102, are alternately interposed between friction discs 106 which are splined to the internal surface 86a of the outer drum 86. A hydraulically operated piston 108 is adapted to selectively engage discs 104 and 106, to drivingly connect drums 102 and 86, and thereby through radial element 84 to drive reaction sun gear 80 at a 1:1 ratio with the converter impeller 16, since the annular element 24 is connected with the radial element 40, the sleeve 42 and the radial element 100 that drives drum 102 of clutch H.

The short pinion 78 of the planetary gear system P is also adapted to mesh with an annular internally toothed ring gear 110 carried by a drum collar 112. The drum collar 112 in turn is supported at its rearward end by a flanged portion 114a of a collar 114, which is rotatably supported about the output shaft 76. A reverse brake band 116 is adapted to be selectively engaged with the drum collar 112, to hold ring gear 110 against rotation in either direction.

Operation of transmission

Following is a description of the operation of the transmission, and also set forth below is a chart illustrating the sequence of operation of the various transmission brakes and clutches.

| | Converter | High Range Clutch | Low Range Brake | Reverse |
|---|---|---|---|---|
| Drive Low | Turbine—Reactor Stationary. | Off | On | Off. |
| Intermediate | Turbine—Reactor Moving | Off | On | Off. |
| High | Turbine and Impeller—Locked Up. | On | Off | Off. |
| Reverse | Turbine | Off | Off | On. |

To operate the transmission in low range drive the low range brake band 88 is applied to drum 86, thereby holding the reaction sun gear 80 against rotation in either direction. Also, the high range clutch H and the reverse band 116 are released. Thus, as engine torque is applied to input shaft 10, the converter impeller 16 commences to drive the turbine member 18, which in turn drives intermediate shaft 22 and driving sun gear 70. Sun gear 70 drives the long pinion 72, which in turn drives the short pinion 78, walking the latter about the held reaction sun gear 80. As the short pinion 78 is walked about the sun gear 80, the carrier 74 and output shaft 76 are rotated therewith in a forward driving direction, in a low range drive. Under these conditions, it will be appreciated the torque multiplication provided by the converter C is compounded by the gear reduction provided by the planetary gears.

As engine torque increases, and the speed of rotation of the turbine 18 approaches the speed of rotation of the impeller 16, the converter C commences to operate substantially as a fluid coupling. Under these conditions, the reactor 14 is lifted off the one-way clutch mechanism 46 and rotates freely at substantially the same speed as the impeller and turbine members. The converter C drives the driving sun gear 70 at substantially a 1:1 ratio and the only torque multiplication provided is through the planetary gears. As a result, output shaft 76 is driven at an intermediate speed range, with the drive through the gear set being the same as in low range drive.

In order to condition the transmission to operate in high range drive, i.e., drive the output shaft 76 at a 1:1 ratio of the input shaft 10, the high range clutch H is activated, and the low range band 88 is disengaged from drum 86. It will be seen that under these conditions, the reaction sun gear 80 is driven at a 1:1 ratio with input shaft 10 by the inner sleeve 42 and the impeller driven annular element 24. Since the reaction sun gear 80 is then driven in direct drive and the driving sun gear 70 is also driven at substantially a 1:1 ratio through turbine 18 (the converter then having reached its theoretical coupling point), the planetary gears are locked, and thus carrier 74 and output shaft 76 are also driven at a 1:1 ratio.

It will be seen that one of the important advantages of this arrangement is that it dispenses with the need of providing a conventional type converter lock-up clutch in order to obtain a direct drive through the transmission, as described in the introductory part of the specification. Also, it will be noted that the annular element 24 of converter C may be of a simple stamped construction and may be included in the converter, without substantially adding to its cost of construction. The insertion of annular element 24 between the turbine 18 and the reactor 14 only slightly, if at all, effects the overall efficiency of the converter C, providing, of course, that the openings therein are of sufficient size to permit an unimpeded toroidal flow of fluid from the turbine to the reactor.

To obtain reverse drive, the high range clutch H and the low brake band 88 are disengaged, and the reverse band 116 is applied to drum 112, holding the ring gear 110 in a fixed position. As input shaft 10 drives the converter impeller 16, turbine 18 drives the intermediate shaft 22 and driving sun gear 70. Sun gear 70 drives long pinion 72, which in turn rotates short pinion 78, and as a result the latter is walked about the internally toothed ring gear 110, driving with it carrier 74 and output shaft 76 in a reverse direction.

From the above description of the operation of the transmission, it will be appreciated that the control system for operating the transmission may be of relatively simplified form, similar to that described in my copending application, Serial No. 498,404, filed March 31, 1955. While the controls themselves do not form a part of this invention, it will be noted that the reverse band 116 may be operated by a direct mechanical linkage with a conventional manual shift-lever. The low band 88 and high range clutch H may be selectively operated in response to predetermined values of a proportionately increasing governor pressure (with respect to car speed) as modulated by a proportional throttle pressure determined by engine throttle position or engine torque output. Such control systems may be arranged in various ways apparent to those skilled in the art, or other types of control systems may be utilized, if desired.

It is to be understood that the present invention may be modified in various ways apparent to those skilled in the art, and the above specification should not be construed as limiting the scope of the following claims. For example, different types of gear reduction systems may be utilized in combination with the converter arrangement previously described, and different means may be used for connecting the impeller and the perforated element 24 of the converter, if desired.

I claim:

1. In a transmission having a gear reduction system with at least two driving members and a torque converter in driving relationship therewith, comprising converter impeller, turbine and reactor members, a perforated annular impeller driven element interposed between said turbine and reactor members, means to drivingly connect the turbine member with one of said driving members of the gear reduction system, and selectively operable means to drivingly connect said annular element with the other of said driving members.

2. In a transmission having an input shaft, an output shaft, and a gear reduction system with at least two driving members and a torque converter in driving relationship therewith, comprising converter impeller, turbine and reactor members, an annular element having openings therethrough interposed between the turbine and reactor members, means to drivingly connect said annular element with said impeller member, means to drivingly connect the turbine member with one of said driving members of the gear reduction system to operate the latter at a predetermined speed ratio, and selectively operable means to connect said annular element with the other of said driving members whereby the gear reduction system is conditioned to operate in a manner to produce a different speed ratio, as between said input and output shafts.

3. In a transmission having an input shaft, an output shaft, and a gear reduction system with at least two driving members and a torque converter in driving relationship therewith, comprising converter impeller, turbine and reactor members, an annular shaped element having inner and outer edge portions and having openings extending therethrough, said annular element being disposed between said turbine and reactor members, means to drivingly connect the inner edge portion of said annular element with said impeller member, means to drivingly connect the turbine member with one of the driving members of the gear reduction system to thereby condition the latter to operate in a given speed range, and selectively operable means to drivingly connect the outer edge portion of said annular element with the other of the driving members whereby the gear reduction system is conditioned to operate in a manner to produce a different speed ratio, as between said input and output shafts.

4. A multi-speed transmission including a converter having impeller, turbine and reactor members and a planetary gear system including a driving sun gear and a reaction sun gear, comprising a thin annular element interposed between said turbine and reactor members, means to drivingly connect said element with the impeller member of the converter, selectively operable means to connect said element with said reaction sun gear, a second selectively operable means to hold said reaction sun gear against rotation, and means to drivingly connect said turbine member with said driving sun gear.

5. A transmission as described in claim 4, wherein said planetary gear system includes meshing pinion gears, one of which is driven by said driving sun gear and the other of which meshes with said reaction sun gear, a pinion carrier rotatably supporting said pinion gears, and an output shaft drivingly connected with said pinion carrier.

6. A transmission as described in claim 4 wherein said planetary gear system includes meshing pinion gears, at least one of said pinion gears being driven by said driving sun gear, and at least one other of said pinion gears meshing with said reaction sun gear, a pinion carrier rotatably supporting said pinion gears, an output shaft drivingly connected with said pinion carrier, and selectively operable means engaging said one other of said pinion gears, whereby the pinion carrier and output shaft may be driven in a reverse direction.

7. A transmission comprising a converter having impeller, turbine and reactor members, an annular element having openings therethrough and being disposed between said turbine and reactor members, means to drivingly connect said annular element with said impeller member, a planetary gear system including a driving sun gear, a reaction sun gear, a first pinion meshing with said driving sun gear, a second pinion meshing with said first pinion and said reaction sun gear, a pinion carrier rotatably supporting said pinion gears, means to drivingly connect said turbine member with said driving sun gear, a selectively operated means to drivingly connect said annular element with said reaction sun gear, and a second selectively operable means to hold said reaction sun gear against rotation.

8. A transmission as described in claim 7, wherein said annular element has an inner portion, and means to drivingly connect said inner edge portion of said element with said impeller member.

9. A transmission as described in claim 7, including a ring gear adapted to mesh with at least one of said pinion gears, and selectively operable means to hold said ring gear against rotation, whereby the pinion carrier may be driven in a reverse direction.

10. A transmission as described in claim 7, including one-way clutch means to hold said reactor member against rotation in one direction, hydraulic pump means, and means drivingly connected to said impeller member to operate said pump.

11. A transmission comprising a torque converter having impeller, turbine and reactor members and an impeller driven perforated element interposed between said turbine and reactor members, a planetary gear system including a driving sun gear, a reaction sun gear, a first pinion gear meshing with said driving sun gear, a second pinion gear meshing with said first pinion gear and said reaction sun gear, a pinion carrier rotatably supporting said pinion gears, an intermediate shaft connecting with said turbine member and driving sun gear, a sleeve connecting with said perforated impeller driven element which is rotatably supported about said intermediate shaft, a selectively operable means to drivingly connect said reaction sun gear with said sleeve, and a second selectively operable means to hold said reaction sun gear against rotation.

12. A transmission as described in claim 11 including an annular internally toothed ring gear adapted to mesh with at least one of said pinion gears, and selectively operable means to hold said ring gear against rotation, whereby the pinion carrier may be driven in a reverse direction.

13. A transmission as described in claim 11 including a transmission casing for enclosing said transmission, a second sleeve grounded to said casing supported about said first sleeve, and one-way brake means carried by said second sleeve connected with said reactor member to maintain the latter against rotation in one direction.

14. A transmission as described in claim 11 including a transmission casing for enclosing said transmission, a second sleeve grounded to said casing supported about said first sleeve, one-way brake means carried by said second sleeve connected with said reactor member to maintain the latter against rotation in one direction, an annular externally toothed ring gear rotatably supported about said second sleeve, collar means to drivingly connect said impeller with said annular gear, and hydraulic pump means drivingly connected to said annular gear.

15. A transmission comprising a converter including impeller, turbine and reactor members and an annular shaped element with openings extending therethrough and having inner and outer edge portions, said annular element being disposed between said turbine and reactor members, means to connect the inner edge portion of said annular element with said impeller, a planetary gear system including a driving sun gear, a first pinion meshing with said driving sun gear, a second pinion meshing with said first pinion, a carrier means for rotatably supporting said pinion gears, a reaction sun gear meshing with said second pinion gear, a rotatable member drivingly connecting said turbine member with said driving sun gear, a sleeve rotatably supported about said rotatable member connecting with the outer edge portion of the annular element, an annular drum connecting with said sleeve, a second annular drum concentrically disposed with respect to said first drum and connecting with said reaction sun gear, friction means carried by said first and second drums, selectively operable means to maintain said friction means in engagement, thereby drivingly connecting said sleeve with said reaction sun gear, and selectively operable brake means to engage said second drum and thereby hold said reaction sun gear against rotation.

16. A transmission as described in claim 15 including an annular internally toothed ring gear adapted to mesh with at least one of said pinion gears, and selectively operable means to hold said ring gear against rotation, whereby the pinion carrier may be driven in a reverse direction.

17. A transmission comprising a converter having impeller, turbine and reactor members and thin annular element having openings therethrough interposed between said turbine and reactor members, means to drivingly connect said thin annular element with said impeller, a planetary gear system including a driving sun gear, a first pinion meshing with said driving sun gear, a second pinion meshing with said first pinion, a carrier means for rotatably supporting said pinion gears, an output shaft connecting with the carrier means, a reaction sun gear meshing with said second pinion gear, a rotatable member connecting said turbine member with said sun gear, a sleeve connecting with said thin annular element and being rotatably supported about said rotatable member, a drum connecting with said sleeve, a second drum connecting with said reaction sun gear being concentrically disposed with respect to said first drum, friction disc elements carried by said first and second drums, selectively operable means to hold said friction discs in engagement to thereby drivingly connect said sleeve with said reaction sun gear, selectively operable brake means to engage said second drum and thereby hold said reaction sun gear against rotation, an annular internally toothed ring gear adapted to mesh with said second pinion gear, selectively operable reverse brake means to hold said ring gear against rotation, a casing for said transmission, a second sleeve grounded to said casing and supported about said first sleeve, one-way brake means carried by said second sleeve connecting with said reactor member to hold the latter against rotation in one direction, an annular externally toothed ring gear rotatably supported about said second sleeve, means to drivingly connect said ring gear with said impeller member and pump means driven by said annular ring gear when said impeller member is rotated.

18. A torque converter for containing fluid, comprising impeller having an inner shell portion, a turbine and reactor member, one-way brake means to hold said reactor member against rotation in one direction, a thin annular shaped element having openings therethrough interposed between said turbine and reactor members, said annular element having an inner edge portion adjacent the inner shell portion of said impeller, means to drivingly connect said inner shell portion of the impeller with the inner edge portion of the annular element, whereby fluid passes through the openings of said annular element as a toroidal movement of the fluid is induced by the rotation of the impeller member.

References Cited in the file of this patent

UNITED STATES PATENTS

| | | |
|---|---|---|
| 2,588,220 | Duffield | Mar. 4, 1952 |
| 2,695,533 | Pollard | Nov. 30, 1954 |
| 2,739,494 | Russell | Mar. 27, 1956 |